March 22, 1938. J. A. SALL 2,111,572
FLUID DISTRIBUTION VALVE
Filed Sept. 8, 1936 2 Sheets-Sheet 1

INVENTOR
John A. Sall
By Parker, Carlson, Pitzner & Hubbard
ATTORNEYS

March 22, 1938. J. A. SALL 2,111,572
FLUID DISTRIBUTION VALVE
Filed Sept. 8, 1936 2 Sheets-Sheet 2
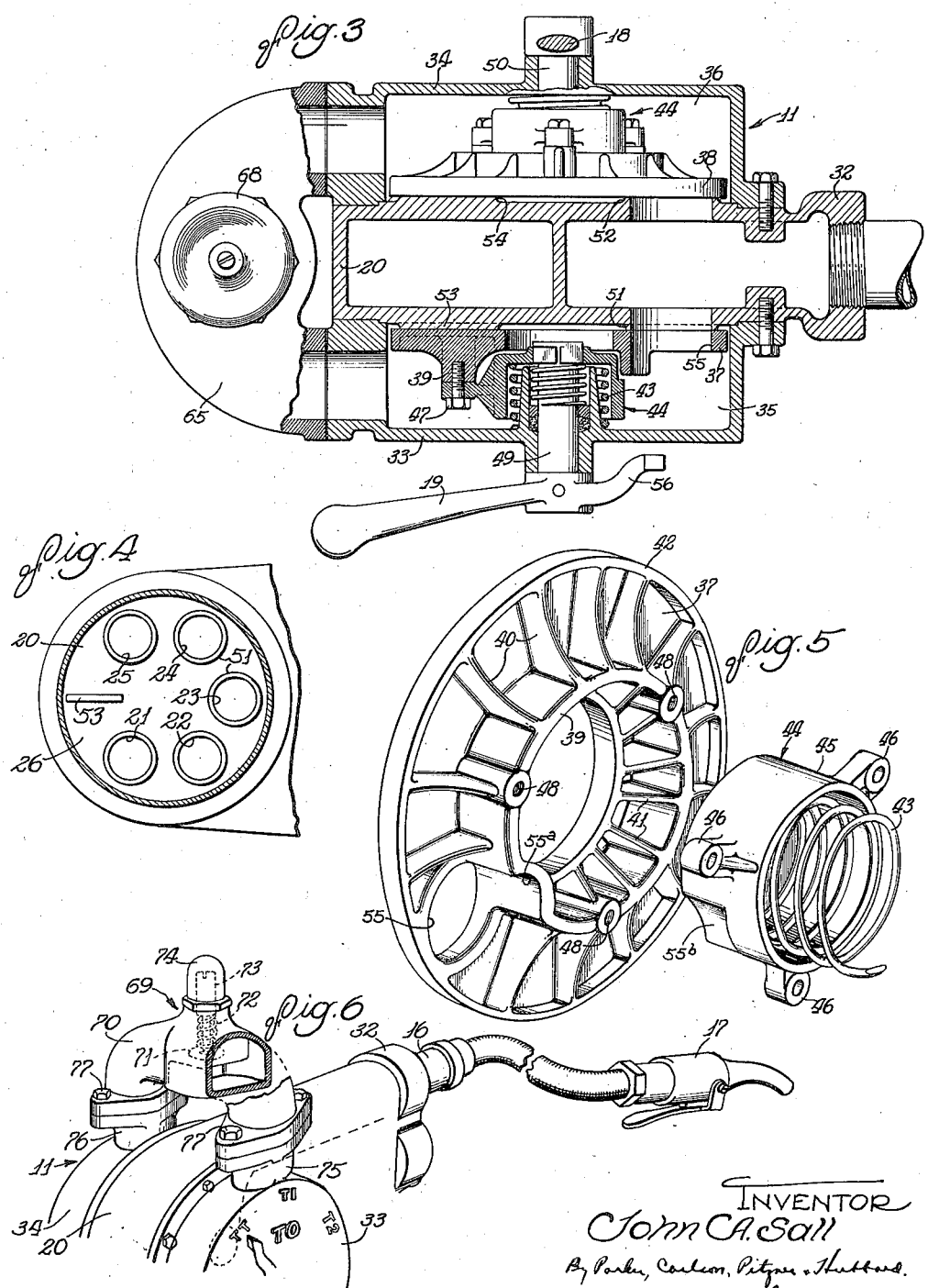
INVENTOR
John A. Sall
By Parker, Carlson, Pitzner & Hubbard.
ATTORNEYS Patented Mar. 22, 1938

2,111,572

UNITED STATES PATENT OFFICE 2,111,572

FLUID DISTRIBUTION VALVE

John A. Sall, Rockford, Ill.

Application September 8, 1936, Serial No. 99,707

16 Claims. (Cl. 277—59)

This invention relates to apparatus for the selective distribution of fluids, either liquid or gas, and particularly to an improved and simplified form of distribution valve for selectively controlling such transfer.

The general object of the invention is to provide a fluid distribution valve of such character that the transfer of fluid between selected points may be established in a simple and convenient manner without confusion or danger of mistake on the part of the operator.

Another object of the invention is to provide such a fluid distribution valve which may be economically constructed from a minimum number of relatively simple parts and which may be readily disassembled for purposes of inspection and repair.

A further object of the invention is to provide a fluid distribution valve of the character described, having a novel by-pass arrangement operable automatically to prevent damage in the event that the mechanism becomes blocked at any point.

Still another object of the invention is to provide a fluid distribution valve of the character described which may be readily conditioned for the distribution of fluid under pressure generated by a power driven pump or alternatively through gravity induced flow.

Further objects and advantages of the invention will become apparent as the following description proceeds and features of the novelties which characterize the invention are pointed out with particularity in the claims annexed hereto and forming a part of this specification.

For a better understanding of the invention, reference may be had to the accompanying drawings in which Figure 1 is a perspective view of a combined valve and pump unit including a fluid distribution valve embodying the present invention.

Fig. 3 is an enlarged partial horizontal sectional view of the distribution valve shown in Fig. 1.

Fig. 4 is a side elevation of the body portion of the distribution valve shown in Fig. 1.

Fig. 5 is an enlarged, exploded, perspective view of one of the valve disks and its cooperating biasing spring arrangement for the valve shown in Fig. 1.

Fig. 6 is a partial perspective view of the upper portion of the distribution valve shown in Fig. 1, the safety by-pass arrangement being shown partly in section in order to illustrate the interior construction thereof.

Figure 1:
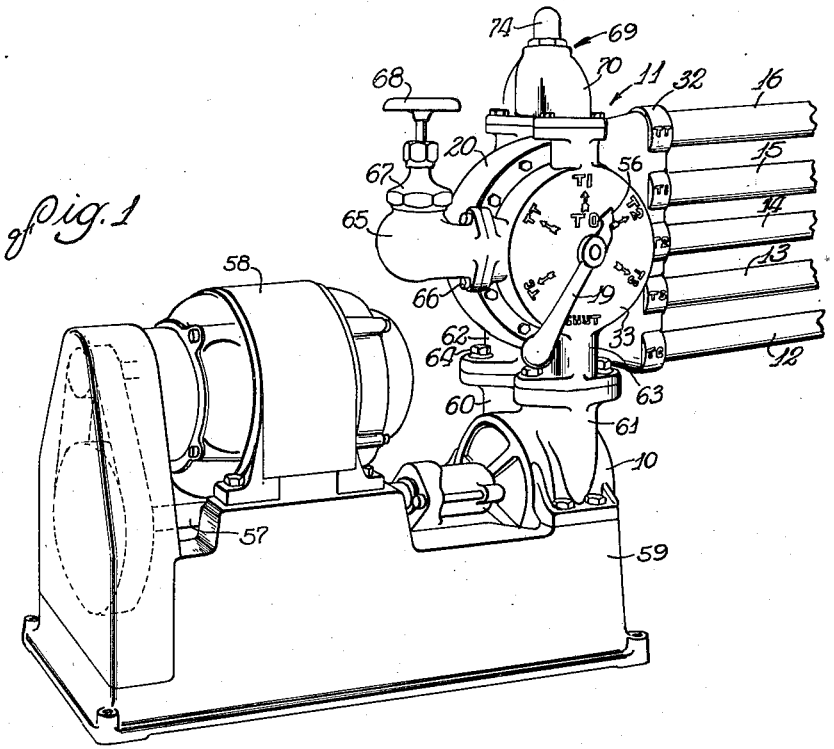
Figure 2:
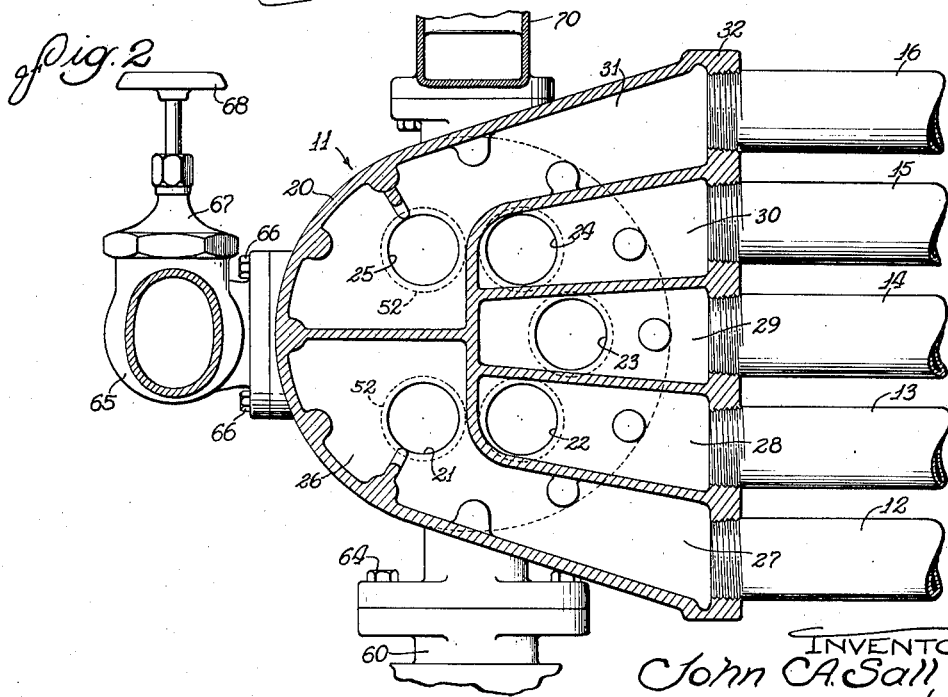
Fig. 2 is an enlarged vertical sectional view of the distribution valve shown in Fig. 1.

In the form selected for purposes of illustration, the invention is embodied in a fluid distribution valve included as an element of a fluid circulating system or unit comprising a power driven pump 10 and a selectively controllable fluid distribution valve 11 by which a passageway may be established from any one of a plurality of different points of storage or supply, with which pipes 12 to 16 inclusive communicate, and for the discharge of the fluid into any other one of the pipes 12 to 16 inclusive. Such a distribution arrangement is particularly adapted for use in a plant for compounding or handling liquid hydrocarbons wherein the pipes 12 to 15 lead respectively to a tank car and tanks, hereinafter referred to as tanks 1, 2 and 3, and the pipe 16 terminates at a portable valve 17 (Fig. 6) by which the fluid may be discharged into any desired container, such as the tank on an automotive truck. It will be understood, however, that I do not intend to limit the invention by the illustrative embodiment, but aim to cover all modifications and alternative constructions falling within the spirit and scope of the invention as expressed in the appended claims.

The distribution valve 11 is composed of two independently operable multiple valve units, one of which is adopted to be adjusted by means of a handle 18 (Fig. 3), hereinafter referred to as the "from" selector, to determine from which of the storage tanks fluid may be withdrawn by the pump. The second unit, which is controllable by handle 19, called the "to" selector, determines into which of the conduits the fluid will be discharged by the pump. To simplify the construction of the valve units, they are provided with a common body in the form of a generally circular disk 20. Extending through the body 20, parallel to the axis thereof, are a plurality of circular and annularly spaced holes 21, 22, 23, 24 and 25, which terminate in ports on one flat side of the body and also in ports on the opposite side of the body, which is also flat and disposed at a plane parallel to the first mentioned side. For a purpose to appear later, the holes are spaced around the body to leave a cored segment 26 of substantial area on one side of the flat surfaces. The flat surfaces are preferably circular and the ports are arranged on arcs of circles concentric therewith.

The body 20 is cored out to form passageways 27, 28, 29, 30 and 31 which terminate at openings in a vertical column 32 at one side of the body 20. The pipes 12 to 16 may be thus disposed parallel to each other and extended through the column 32 on one side of the valve body thereby contributing to the compactness of the piping arrangement and ease of installation.

Bolted to the opposite flat sides of the body are two circular casings 33 and 34 (Fig. 3) which define chambers 35 and 36 respectively, enclosing the ports on the opposite surfaces of the body 20. Mounted within chambers 35 and 36 are valve controlling members adapted to control the opening and closing of the several ports formed on the opposite sides of the body 20 from actuation of the selector handles 18 and 19. In the particular construction illustrated, these valve controlling members are shown in the form of disk shaped plates 37 and 38 which are yieldingly urged against the adjacent surfaces of the body 20 by suitable biasing arrangements hereinafter described.

Each of the valve disks 37 and 38 is preferably so constructed as to have a maximum of rigidity and strength with a minimum of weight. As best shown in Fig. 5, the valve disk 37 is provided with an anular upstanding rib 39 formed on the outer surface thereof. The rib 39 is integrally connected with disk 37 and is further connected thereto by radially extending strengthening webs 40 and 41 located on the outer and inner sides thereof respectively. A second shorter annular rib or flange 42 preferably extends about the outer edge of the disk 37 and is integrally connected to the ribs 40. The plate 38 is substantially identical in construction with the plate 37.

An arrangement is provided for yieldingly urging the plates 37 and 38 against surfaces of the body 20 in such manner that the biasing force exerted on the plates is distributed over the surfaces thereof thus preventing warping or misalinement of the same. In the preferred arrangement illustrated, the plate 37 is urged against the valve body by a compression spring 43, supported by a spider 44 having a cup-shaped body portion 45 with radially projecting lugs 46 formed thereon. The lugs 46 are connected to the rib 39 on the valve plate 37 by screws 47 passing through holes formed in the lugs and threaded in suitable tapped holes 48 formed in the rib 39. A duplicate spring biasing arrangement is provided for the plate 38. Shafts 49 and 50, on which the selector handles 19 and 18 respectively are mounted, extend through bearings at the centers of the casings 33 and 34 and at their inner squared ends, project into correspondingly shaped apertures formed in the bottom walls of the cup-shaped body portion 45 of the spiders 44. The selector handles 19 and 18 are thus operatively connected to the valve plates 37 and 38, respectively, for rotating the same about an axis coincident with the center of the imaginary circle on which the holes 21 to 25 inclusive are located.

Annular outwardly projecting lands 51 and 52 are preferably formed on the opposite flat surfaces of the body 20 surrounding the ports or openings therein to form wear-resistant valve seats against which the plates 37 and 38 bear. In addition, these lands 51 and 52 scrape off any dirt, grit and other foreign matter which may become lodged between the surfaces of the valve body and the valve plates. Such foreign matter might otherwise not only obstruct the movement of the valve plates but would also score the adjacent surface of the valve plates and valve body, and in some cases cause misalinement and leakage of fluid. Ribs 53 and 54, of the same height as the lands 51 and 52, are also preferably formed on the opposite sides of the valve body 20 in the unapertured sectors thereof to scrape any foreign matter from the adjacent surfaces of the valve plates as they pass over the ribs.

Each of the plates 37 and 38 is formed with a hole 55 corresponding in size and shape to the ports in the valve body 20 so as to register with these ports and permit the flow of fluid through the plates when the hole in the latter is alined with the port in the valve body 20. Suitable registering recesses 55$^a$ and 55$^b$ are formed in the ribs 39 and spider bodies 45 so as to avoid the obstruction of fluid flow through the holes 55.

Legends are marked on the exterior of the casing 33 in positions such that when the pointer 56 on the "to" selector handle is directed toward any one of the legends "T—1, T—2, T—3, TC, and TT", the hole 55 in the plate 37 will register with a port in the body 20 which establishes communication between the chamber 35 and the tank represented by the legends thus selected, all of the other ports in the corresponding side of the body 20 being maintained closed by the plate 37. When the selector is set in the "shut" position, the hole 55 is positioned opposite the solid segment 26 on the body 20 and the chamber 35 is disconnected from all of the passageways. In a similar way the "from" selector may be adjusted to any one of a plurality of positions indicated by the legends "T—1, T—2, T—3, TC and TT" to connect the chamber 36 with any one of the tanks.

The two chambers 35 and 36 are connected permanently with the intake and outlet sides of the pump 10 which preferably is of the rotary gear type having a shaft 57 arranged to be driven through a suitable speed-reducing mechanism by an electric motor 58. Both the pump 10 and the motor 58 are preferably mounted on a common base 59 (Fig. 1). The pump 10 is provided with an inlet 60 and an outlet 61 communicating respectively with the chambers 36 and 35 through suitable connections 62 and 63 formed on the lower portions of the casings 34 and 33 respectively. Upon reference to Fig. 1, it will be seen that the casings 33 and 34 are removably secured to the pump 10 by suitable flange and bolt connections so that the distribution valve unit 11 may be disconnected as a whole from the pump by removal of the bolts 64. It will be noted that no pipes or like parts are required, such parts being normally subjected to vibration. Consequently, the danger of leakage in the packing of the pump shaft as the result of vibration is thus effectually avoided.

An arrangement has also been provided for utilizing the distribution valve 11 for directing a gravity flow of fluid as contrasted with a pressure flow induced by the pump. In the particular construction illustrated, this arrangement includes a by-passage conduit 65 communicating at its opposite ends with the chambers 35 and 36 and removably supported on the casings 33 and 34 by bolts 66. The flow of fluid through the by-passage 65 is selectively controlled by a manually operable shut-off valve 67, provided with a hand wheel 68. The valve 67 is normally maintained closed when fluid is being circulated by the pump 10. When the relative location of the tanks is such that gravity flow may be used, pump 10 is shut off and valve 67 is opened to establish communication between chambers 35 and 36 through by-passage conduit 65.

To avoid damage in the event that both of the selectors are in the "shut" position when the pump is in operation or the established passageways otherwise blocked, a second by-pass controlled by an automatic spring loaded valve 69 (Fig. 6) is interposed between the chambers 35 and 36. This second by-pass is formed in part by a casing 70 provided with a seat for a valve element 71, which is seated by compression spring 72 with a pressure determined by the adjustment of a screw 73 within a removable cap 74. Suitable flange connections are provided at the open ends of the casing 70 and pipes 75 and 76 communicating with the chambers 35 and 36 respectively. The casing 70 is detachably secured in position by bolts 77. It will be noted that the lower face of the valve disk 71 is exposed to the discharge pressure of the pump through chamber 35 and pipe 75 at all times so that this fluid pressure tends to move the valve 71 to its open position against the bias of the compression spring 72. Normally, the disk 71 will be held seated with the by-pass closed. Upon development of a predetermined maximum pressure in the chamber 35, however, the disk will be raised automatically allowing the fluid to flow from the pressure side of the pump to the suction side thereof. Such development of pressure may result from closure of the manually operable valve 17 when the "to" selector handle 19 is set for discharge of the fluid through the truck tank conduit 16. In this way, the flow of fluid from the conduit 16 may be interrupted without danger of building up excessive pressure in the main valve.

To illustrate the operation of the fluid distribution valve described above, let it first be assumed that it is desired to transfer liquid from a tank car connected to pipe 12 to tank No. 1 connected to pipe 15. For this purpose the "from" selector 18 is moved to the "TC" position thereby bringing the hole in the disk 38 into registry with the port 21 and establishing communication between the tank car and the suction side of the pump. The "to" selector is then moved to the "T—1" position thereby bringing the hole 55 in plate 37 into registry with port 24 and thus establishing communication between the discharge side of the pump 10 and pipe 15. Then the pump would be started and the liquid withdrawn from the tank car would flow through pipe 12 into the passage 27 and the valve body 20, through port 21 and into the chamber 36. From the interior of chamber 36, the liquid would be drawn into the pump 10 and discharged into the chamber 35 from which it would flow into port 24 through passage 30 in the valve body 20 and thence through pipe 15 to the tank No. 1. When the tank car has been emptied or the desired amount of liquid removed therefrom, the motor would be stopped and the "from" selector moved to its "shut" position to interrupt the passageway previously used and prevent the subsequent transfer of liquid by gravity from tank No. 1 to the tank car in the event that the level of the liquid in the tank is above that in the tank car.

If liquid is to be transferred from the tank car to tank No. 1 by gravity flow rather than by use of the pump 10, the "to" and "from" selectors are moved to their "T—1" and "TC" positions, respectively, as described above, but instead of starting the pump 10, the valve 67 is opened by hand wheel 68 to establish communication between chambers 35 and 36. The flow of liquid is then the same as that described above, except that it passes from chambers 36 and 35 through by-passage conduit 65 rather than through the pump 10.

From the foregoing, it will be apparent that a fluid may be transferred from any receptacle connected to any one of the pipes 12 to 16 inclusive to a second receptacle connected to any other one of the pipes 12 to 16 inclusive either by gravity flow or under pressure of the pump 10 upon suitable setting of the selectors. It will also be apparent that with the valve arrangement above described, the valve will be conditioned readily and conveniently for the transfer of fluid between any two points without danger of mix-up on the part of the operator. The valve members are of simple construction and adapted to maintain tight closure of all surfaces not intended to be opened. Moreover, with the present arrangement, the pump is adapted both for withdrawing fluid from the selected sources and also for delivering the fluid to a selected point so that a single pump may be used with the distribution valve illustrated.

This application is a continuation in part of my application Serial No. 622,957, filed July 16, 1932.

I claim as my invention:

1. A selective fluid transfer valve comprising, in combination, a body having parallel flat faces on opposite sides thereof each with a plurality of ports therein, said body having open-ended passageways extending through the body parallel to said faces and each communicating with a port in each of the faces, a pair of casings each enclosing one of said faces, a pair of plates each disposed within one of said casings and yieldingly urged against one of said faces, each of said plates having a hole therethrough adapted to register with different ports to establish communication between such port and the chamber defined by the casing enclosing the plate, and a conduit establishing communication between said chambers externally of said body, one of said faces having a solid section with which the hole in the associated plate may register whereby to close all of the ports in such face.

2. A multiple valve comprising, in combination, a body having passageways leading thereinto and terminating in two sets of openings, a pair of casings cooperating with said body to define separate chambers and each enclosing one of said sets of openings, means establishing communication between said chambers, and a pair of valve members respectively operable from points exteriorly of said casings to establish communication between one of said chambers and any opening of one of said sets.

3. A valve having, in combination, means providing a plurality of passageways through which fluid may flow, means providing a set of ports communicating respectively with a plurality of said passageways, a casing enclosing said ports and having an outlet from which fluid may be withdrawn, means providing a second set of ports communicating with a plurality of said passageways, a second casing enclosing said second set of ports and having an inlet into which said fluid is discharged, and independently operable valve members within the chambers defined by said casings, one being operable selectively to uncover one port and close the other ports in said first mentioned set, the other being operable selectively to uncover one port and close the other port in said second mentioned set.

4. A valve comprising, in combination, a body having a pair of flat faces each with a plurality of ports therein, passageways in said body each communicating with a port in each of said faces, a pair of casings each enclosing one of said faces, means establishing communication between said casings, a pair of valve disks each disposed within one of said casings and yieldingly urged against one of said faces, each of said disks having a hole therein adapted to register with the different ports on said body upon rotation of the disk into different angular positions, a by-passage for establishing communication between said casings, and a spring-closed valve normally closing said by-passage and adapted to open the latter upon the development of a predetermined pressure within one of the casings.

5. A multiple valve having, in combination, means providing a plurality of passageways through which fluid may flow, means providing a set of ports communicating respectively with a plurality of said passageways, a casing enclosing said ports and having an inlet opening, means providing a second set of ports communicating with a plurality of said passageways, a second casing enclosing said second set of ports and having an outlet opening, a valve member within said first mentioned casing operable selectively from a point exteriorly thereof to uncover one port and close the other port of said first mentioned set, means providing a by-passage between said casings having a normally closed valve adapted to prevent the flow of fluid therethrough until a predetermined pressure has been developed in said second casing, a conduit communicating with said by-passage between said valve and said second casing, and a manually operable valve controlling the flow of fluid through said conduit.

6. A valve of the character described comprising a body having flat surfaces on opposite sides thereof and a plurality of open-ended passageways extending substantially parallel to said surfaces, said body having a plurality of holes extending therethrough perpendicular to said surfaces and each communicating with one of said passageways, a pair of casings each enclosing one of said surfaces and the openings therein, a pair of plates each disposed within one of said casings and yieldingly urged against one of said surfaces, each plate having an aperture therein adapted by shifting of the plate to be brought into register with a selected one of said holes, and means providing a passageway establishing communication between said chambers.

7. A valve having, in combination, means providing a plurality of passageways through which fluid may flow, means providing a set of ports communicating respectively with a plurality of said passageways, a casing enclosing said ports and having an outlet from which fluid may be withdrawn, means providing a second set of ports communicating with a plurality of said passageways, a second casing enclosing said second set of ports and having an outlet into which said fluid is discharged, a valve member within said first mentioned casing operable selectively from a point exteriorly thereof to uncover one port and close the other port of said first mentioned set, and a valve member in said other casing movable selectively into a plurality of different positions in each of which one port in said second set is uncovered and the remaining ports are covered and into another position in which all of the ports in said second set are closed.

8. A valve having, in combination, a body having a plurality of passages through which liquid may flow into and out of the body, a pair of casings each enclosing the open ends of a plurality of said passageways, a valve member within each of said casings movable to establish communication between the chamber defined by the casing and any one of the openings enclosed thereby, and means providing a passageway disposed below the level of said casings and having its opposite ends communicating respectively with the chambers defined by said casings.

9. A valve having, in combination, a body having a plurality of passages through which liquid may flow into and out of the body, a pair of casings located on opposite sides of said body and each defining a chamber enclosing the ends of a plurality of said passageways, and a pair of valve members disposed within the respective casings and mounted to turn about a common axis, each of said members being movable selectively into different positions to establish communication between the chamber defined by the enclosing casing and any one of the passageways enclosed thereby, means providing a passageway externally of said body and having opposite ends communicating with the respective chambers.

10. A fluid distribution valve comprising, in combination, a body having a pair of flat faces each with a plurality of ports therein, passageways in said body each communicating with a port in each of said faces, a pair of casings each enclosing one of said faces, means including outlet and inlet ports in the respective casings for establishing communication therebetween through a suitable fluid circulating apparatus, a pair of disks each disposed within one of said casings and yieldingly urged against one of said faces, each of said disks having a hole therein adapted to register with the different ports on said body upon rotation of the disks into different angular positions, a by-passage for establishing communication between said casings for a gravity induced flow of fluid therebetween, a manually operable valve for selectively opening and closing said by-passage, a second by-passage for establishing communication between the said casings, and a spring closed valve normally closing said second by-passage and adapted to open the latter from the development of a predetermined pressure within one of the casings.

11. A fluid distribution valve comprising, in combination, a body having a pair of flat faces each with a plurality of ports therein, passageways in said body each communicating with a port in each of said faces, a pair of casings each enclosing one of said faces, means including outlet and inlet ports in respective casings for establishing communication therebetween through a suitable fluid circulating apparatus, a pair of valve disks each disposed within one of said casings and yieldingly urged against one of said faces, each of said disks having a hole therein adapted to register with the different ports on said body upon rotation of the disks through different angular positions, a by-passage for establishing communication between said casings for a gravity induced flow of fluid therebetween, and a valve for selectively opening and closing said by-passage.

12. A fluid distribution valve comprising, in combination, a body having a pair of flat faces each with a plurality of ports therein, passageways in said body each communicating with a port in each of said faces, a pair of casings each enclosing one of said faces, means including outlet and inlet ports in respective casings for establishing communication therebetween through a suitable fluid circulating apparatus, a pair of valve disks each disposed within one of said casings and having an annular rib thereon projecting outwardly therefrom, each of said disks having a hole therein adapted to register with the different ports on said body upon rotation of the disks through different angular positions, and means including compression springs connected to said annular ribs for yieldingly urging said disks against the adjacent faces of said body.

13. A fluid distribution valve of the character described comprising, a body having circular flat surfaces on the opposite sides thereof and a plurality of open-ended passageways extending substantially parallel to said surfaces, said body having a plurality of holes extending therein perpendicular to said surfaces and each communicating with one of said passageways, the open ends of said holes being disposed on the arc of a circle, a pair of casings each enclosing one of said surfaces and the openings therein, a pair of disk shaped plates each disposed within one of said casings and rotatable about an axis coincident with said centers of said circles, each plate having an aperture therein adapted to be brought into register with a selected one of said holes upon shifting of the plate, an annular rib formed on the outer side of each of said disks and connected thereto by a plurality of radially extending strengthening webs, means including compression springs engaging said ribs at a plurality of spaced points for yieldingly urging said disks against said flat surfaces, and means providing a passageway for establishing communication between said chambers.

14. A fluid distribution valve of the character described comprising, a body having circular flat surfaces on the opposite sides thereof and a plurality of open-ended passageways extending substantially parallel to said surfaces, said body having a plurality of holes extending therein perpendicular to said surfaces and each communicating with one of said passageways, the open ends of said holes being disposed on the arc of a circle, a pair of casings each enclosing one of said surfaces and the openings therein, a pair of disk shaped plates each disposed within one of said casings and rotatable about an axis coincident with said centers of said circles, each plate having an aperture therein adapted to be brought into registry with a selected one of said holes by shifting of the plate, an annular rib formed on the outer side of each of said disks and connected thereto by a plurality of radially extending strengthening webs, said annular ribs being disposed inwardly with respect to said apertures in said disks, spring supporting spiders located on the outer sides of each of said disks, each of said spiders including a cup-shaped body portion having projecting lugs thereon bearing against said annular ribs at spaced points, means including compression springs interposed between the bottoms of said cup-shaped body portions of said spiders and the adjacent inner walls of said casings for yieldingly urging said disks against said flat surfaces, and means providing a passageway establishing communication between said chambers.

15. A fluid distribution valve comprising, in combination, a valve body having a pair of flat faces each with a plurality of ports therein, passageways in said body each communicating with a port in each of said faces, annular outwardly projecting lands surrounding each of said ports and forming wear resistant valve seats therefor, a pair of casings each enclosing one of said faces, means establishing communication between said casings, and a pair of valve disks each disposed within one of said casings and yieldingly urged against one of said faces, each of said disks having a hole therein adapted to register with the different ports on said body upon rotation of the disk into different angular positions.

16. A fluid distribution valve comprising, in combination, a valve body having a pair of flat faces each with a plurality of ports therein arranged on the arcs of circles, each of said faces having an imperforate sector, passageways in said body each communicating with a port in each of said faces, annular outwardly projecting lands surrounding each of said ports and forming wear resistant valve seats therefor, at least one outwardly projecting rib formed on said imperforate sectors of the same height as said lands, a pair of casings each enclosing one of said faces, means establishing communication between said casings, and a pair of valve disks each disposed within one of said casings and yieldingly urged against one of said faces, each of said disks having a hole therein adapted to register with the different ports on said body upon rotation of the disk into different angular positions about an axis concentric with the axis of said circles.

JOHN A. SALL.